Jan. 1, 1924
W. MERTÉ
PHOTOGRAPHIC LENS
Filed Aug. 13, 1921
1,479,196
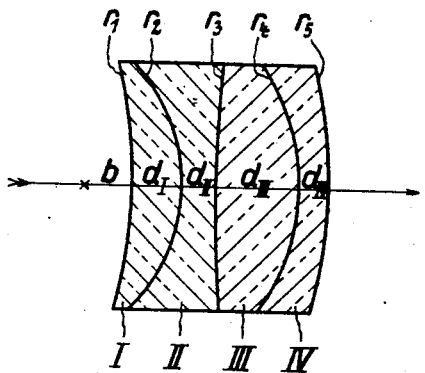
Inventor:
Willy Merté

Patented Jan. 1, 1924.

1,479,196

UNITED STATES PATENT OFFICE.

WILLY MERTÉ, OF JENA, GERMANY, ASSIGNOR TO THE FIRM OF CARL ZEISS, OF JENA, GERMANY.

PHOTOGRAPHIC LENS.

Application filed August 13, 1921. Serial No. 492,120.

(GRANTED UNDER THE PROVISIONS OF THE ACT OF MARCH 3, 1921, 41 STAT. L., 1313.)

*To all whom it may concern:*

Be it known that I, WILLY MERTÉ, a citizen of the German Empire, residing at Jena, Germany, have invented a new and useful Photographic Lens (for which I have filed an application in Germany, March 22, 1919; Austria, June 22, 1920; France, July 2, 1920, Patent No. 518729; England, July 5, 1920, Patent No. 146465; and Italy, July 8, 1920), of which the following is a specification.

The present invention relates to a photographic lens, which consists of four members cemented together. In the new kind of this type of lens introduced by the present invention each of the five limiting surfaces of the lens (i. e., the two outer surfaces and the three cemented surfaces), with the exception of the one lying middlemost, turns its concave side towards the diaphragm, each of the two outer surfaces has a slighter curvature than the respective adjacent cemented surface, and the refractive indices are chosen so that the first member (from the diaphragm) has a smaller refractive index than the second member, and the third member a higher refractive index than both the second and the fourth member. The new lens permits of simultaneously correcting the chromatic aberrations in a sufficient measure, of obtaining a comparatively large aperture ratio, and of correcting in a high degree the astigmatism and the curvature of the image-field over an extraordinarily large field.

In the annexed drawing a constructional example of the invention is shown in axial section.

The following table contains the essential values, the dimensions applying to the focal length 100.

$r_1 = -19.7 \quad b = 1.9$
$r_2 = -7.1 \quad d_I = 2.0$
$r_3 = +44.5 \quad d_{II} = 1.4$
$r_4 = -8.7 \quad d_{III} = 3.4$
$r_5 = -19.4 \quad d_{IV} = 1.2$

|  | I. | II. | III. | IV. |
|---|---|---|---|---|
| $n_D =$ | 1.46080 | 1.51000 | 1.62390 | 1.60600 |
| $\nu =$ | 66.7 | 63.6 | 57.1 | 44.0 |

The lens according to this example may suitably be used up to an aperture ratio of 1:9.5. A double lens composed of two identical lenses is suitable up to an aperture ratio of 1:5.

I claim:

1. In a photographic lens four members cemented together, each of the five boundary surfaces, except the middlemost, turning its concave side towards the diaphragm, each of the two outer surfaces having a slighter curvature than the respective adjacent cemented surface, the first member (from the diaphragm) having a smaller refractive index than the second member and the third member having a higher refractive index than both the second and the fourth member.

2. In a photographic objective two lenses in each of which each of the five boundary surfaces, except the middlemost, turning its concave side towards the diaphragm, each of the two outer surfaces having a slighter curvature than the respective adjacent cemented surface, the first member (from the diaphragm) having a smaller refractive index than the second member and the third member having a higher refractive index than both the second and the fourth member.

WILLY MERTÉ.

Witnesses:
PAUL KRÜGER,
RICHARD HAHN.